Figure 1:
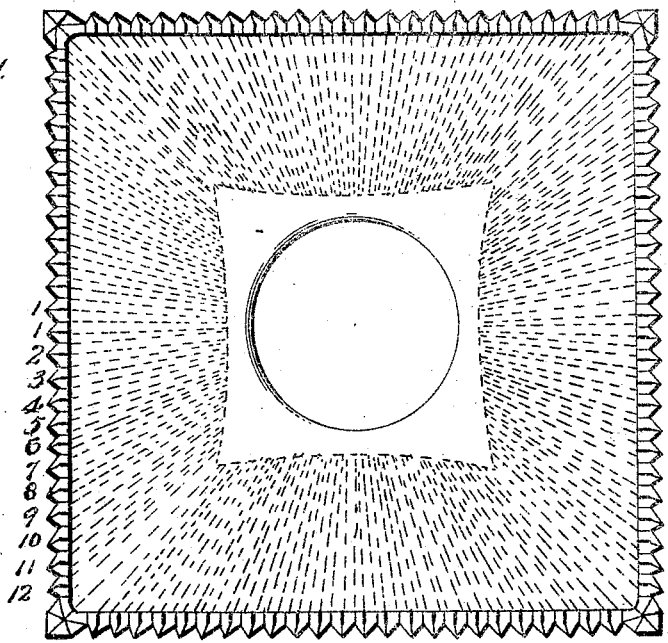

O. A. MYGATT.
GLASS STRUCTURE.
APPLICATION FILED SEPT. 20, 1907.

1,097,042.

Patented May 19, 1914.

2 SHEETS—SHEET 1.

WITNESSES
Chas. K. Davies
Lee Smith

INVENTOR
Otis A. Mygatt
by Bartlett & Brock
Attorneys

O. A. MYGATT.
GLASS STRUCTURE.
APPLICATION FILED SEPT. 20, 1907.

1,097,042.

Patented May 19, 1914.
2 SHEETS—SHEET 2.

WITNESSES
Chas. K. Davies
M. Smith

INVENTOR
Otis A. Mygatt
by Bartlett & Brock
Attorneys

UNITED STATES PATENT OFFICE.

OTIS A. MYGATT, OF NEW YORK, N. Y.

GLASS STRUCTURE.

1,097,042.  Specification of Letters Patent.  Patented May 19, 1914.

Application filed September 20, 1907. Serial No. 393,817.

*To all whom it may concern:*

Be it known that I, OTIS A. MYGATT, a citizen of the United States, residing at New York city, in the State of New York, have invented new and useful Improvements in Glass Structures, of which the following is a specification.

In the use of double reflecting prisms, formed upon the surface of glass structures designed mainly for use in reflecting light from a more or less concentrated light source, the problem is an easy one if the sheet or plate of glass is curved substantially concentric with the light source. In the concentric disposition double reflecting specular prisms of about 90° give excellent results, for each prism is arranged, with respect to the light source, so as to present angles of about 45° thereto. Considerable difficulty arises however where the prismed sheet or plate is straight or non-concentric, and the light source concentrated. In such a case if the double prisms be substantially 90° prisms, those lying at right angles to the light source will be highly efficient, while those on either side will not be so efficient, each prism farther away from the maximum reflecting point getting less and less efficient because the rays of light are more and more off the proper reflecting angles.

To provide a straight or non-concentric reflecting prism glass structure which is highly efficient substantially throughout, from a concentrated light source, is the object of my invention.

In the drawing is shown diagrammatically in section a straight sheet of glass which is bent angularly into rectangular form, for illustrative purposes.

Figure 2:
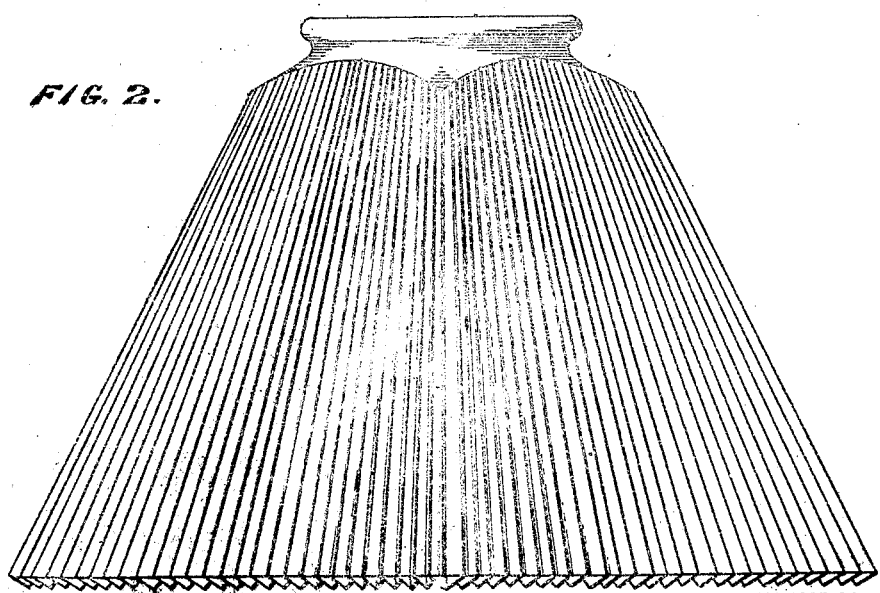
Figure 3:
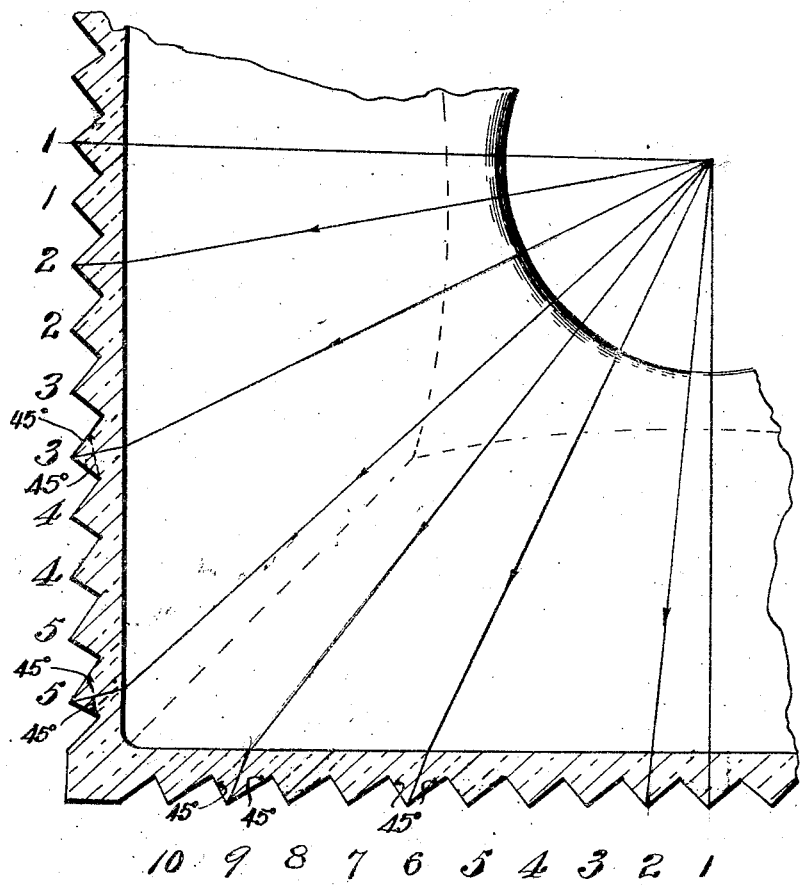

Figure 1 is a plan of the under or inner side of a reflector embodying my invention; Fig. 2 is a side elevation; and Fig. 3 is a horizontal section of a portion of my reflector drawn on an enlarged scale.

The double prisms 1, at right angles to the light source 6, are about 90° prisms. Each prism 2, 3 and 4, etc., to either side of the prisms 1, are made with such varying angles as will give the maximum reflection at that point. Or, to state it differently, in this particular exemplification, each of the double prisms 1, 2, 3, 4, 5, etc., are disposed so as to present two substantially 45° surfaces to the light source, at right angles thereto, and the angle of each prism varies from its neighbor on either side. Where the glass structure is not straight, but the surface is non-concentric to the source of light, similar disposition is made. These prismed reflectors give a practically uniform light-distribution from a concentrated light source. Such prisms are so disposed that the ray of light passes through the apices of each of them at substantially the same angle. In the symmetrical arrangement about a common center the ribs or prisms may be parallel or radiating from the non-concentric glass body. The side opposite the ribbed or prism side may be smooth or ribbed.

The form of the reflector may be of any polygonal elliptical or non-concentric shape.

The glass structure is not confined in its use to reflectors or shades. The arrangement of ribs or prisms such as are here described may be applied to any form of glass structure where it is desired to produce light-modifying effects.

By the word non-concentric as used in the specification and claims is meant any configuration having straight or curved sides, the surface of which is non-concentric to a given source of light. For example, the body might be symmetrically disposed about a source of light in a polygonal structure and the light-modifying surface thereof not be concentric to the light source.

I claim:

1. A glass reflector having its sides non-concentric to an artificial source of light within and formed with prisms, each presenting its sides at substantially an angle of 45° to said source of light.

2. A glass reflector having its sides non-concentric to an artificial source of light within and formed with prisms, each presenting its sides at substantially an angle of 45° to said source of light, said reflector having a plane surface opposite said prisms.

In testimony whereof I have subscribed my name in the presence of two witnesses.

OTIS A. MYGATT.

Witnesses:
  F. B. BROCK,
  ROBERT KELLY, Jr.